US012768464B2

(12) United States Patent
Furukawa et al.

(10) Patent No.: US 12,768,464 B2
(45) Date of Patent: Oct. 20, 2026

(54) VALVE AND VALVE ASSEMBLY METHOD

(71) Applicant: EAGLE INDUSTRY CO., LTD., Tokyo (JP)

(72) Inventors: Kenta Furukawa, Tokyo (JP); Naoki Nishimura, Tokyo (JP); Yu Deguchi, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 69 days.

(21) Appl. No.: 18/852,398

(22) PCT Filed: Mar. 28, 2023

(86) PCT No.: PCT/JP2023/012492
§ 371 (c)(1),
(2) Date: Sep. 27, 2024

(87) PCT Pub. No.: WO2023/195385
PCT Pub. Date: Oct. 12, 2023

(65) Prior Publication Data

US 2025/0215985 A1 Jul. 3, 2025

(30) Foreign Application Priority Data

Apr. 4, 2022 (JP) ................................ 2022-062562

(51) Int. Cl.
*F16K 27/04* (2006.01)
*F16K 11/07* (2006.01)

(52) U.S. Cl.
CPC ............ *F16K 27/041* (2013.01); *F16K 11/07* (2013.01); *F16K 27/048* (2013.01)

(58) Field of Classification Search
CPC ...... F16K 11/07; F16K 27/041; F16K 27/048; F16K 31/0613
See application file for complete search history.

(56) References Cited

U.S. PATENT DOCUMENTS 4,581,978 A 4/1986 Thebert
4,616,900 A 10/1986 Cairns
(Continued)

FOREIGN PATENT DOCUMENTS

JP 2002-168359 A2 6/2002
JP 2002-327856 11/2002
(Continued)

OTHER PUBLICATIONS

International Search Report, Written Opinion and International Preliminary Report on Patentability issued in PCT/JP2023/012492, dated Jun. 20, 2023, 20 pages.
(Continued)

*Primary Examiner* — Eric Keasel
(74) *Attorney, Agent, or Firm* — HAYES SOLOWAY P.C.

(57) ABSTRACT

A valve capable of maintaining a stable fixed state between a retainer and a casing for a long period of time and a method of assembling the valve are provided. A retainer includes a cylindrical portion which has a seat surface for a biasing member and an expanded diameter portion which expands radially outward in a tapered shape from one axial end of the cylindrical portion on a side of a casing, and a caulking end is locked to an outer peripheral portion of the expanded diameter portion while a connection portion between the cylindrical portion and the expanded diameter portion is elastically deformable.

5 Claims, 4 Drawing Sheets

(56) References Cited

U.S. PATENT DOCUMENTS

| | | | |
|---|---|---|---|
| 4,620,565 | A | 11/1986 | Brown |
| 4,635,683 | A | 1/1987 | Nielsen |
| 5,014,747 | A | 5/1991 | Suzuki et al. |
| 5,076,326 | A | 12/1991 | Mccabe |
| 5,141,448 | A | 8/1992 | Mattingly et al. |
| 5,184,644 | A | 2/1993 | Wade |
| 5,845,667 | A | 12/1998 | Najmolhoda et al. |
| 6,073,911 | A | 6/2000 | Reiter |
| 6,145,540 | A | 11/2000 | Linkner, Jr. |
| 6,179,268 | B1 | 1/2001 | Seid |
| 6,688,334 | B2 | 2/2004 | Kawamura et al. |
| 6,774,623 | B2 | 8/2004 | Palfenier et al. |
| 7,165,574 | B2 | 1/2007 | Ryuen et al. |
| 7,213,612 | B2 | 5/2007 | Weiler, Jr. |
| 8,382,064 | B2 * | 2/2013 | Nisinosono ......... F16K 31/0613 251/365 |
| 8,418,724 | B2 | 4/2013 | Suzuki et al. |
| 9,297,474 | B2 | 3/2016 | Suzuki et al. |
| 9,494,237 | B2 | 11/2016 | Veiga et al. |
| 10,302,208 | B2 | 5/2019 | Lamb et al. |
| 10,443,746 | B2 | 10/2019 | Okamura et al. |
| 11,710,591 | B2 | 7/2023 | Lee et al. |
| 2008/0257433 | A1 | 10/2008 | Tsujimoto |
| 2009/0057594 | A1 * | 3/2009 | Tsujimoto ........... F16K 31/0613 251/324 |

FOREIGN PATENT DOCUMENTS

| | | |
|---|---|---|
| JP | 2005-076687 | 3/2005 |
| JP | 2010-003447 | 1/2010 |
| JP | 2014-194969 | 10/2014 |
| JP | 2019-044843 | 3/2019 |
| JP | 2020-041686 | 3/2020 |
| JP | 2020-193637 | 12/2020 |
| WO | WO2010024282 | 3/2010 |

OTHER PUBLICATIONS

International Search Report, Written Opinion and International Preliminary Report on Patentability issued in PCT/JP2023/012493, dated Jun. 20, 2023, 20 pages.

* cited by examiner 21
23h
23d
P2"
21c
23b
23
P1"
23e
23a
21b
(b)
21
23d
23h
21c
23b
23
23e
23a
21b
23h
23d
23g
P2"
21b
21c
23c
S1"
23f
P1"
(c)
21
23h
23d
23g
P2"
21c
23b
29
23f
23c
23
S1"
P1"
22
23e
23a
21b
L1

(b)

VALVE AND VALVE ASSEMBLY METHOD

Cross Reference to Related Applications

This application is a US National Phase of PCT International Patent Application Serial No. PCT/JP2023/012492, filed Mar. 28, 2023, which claims priority to Japanese Patent Application Serial No. 2022-062562, filed Apr. 4, 2022, the contents of which are incorporated herein by reference.

TECHNICAL FIELD

The present invention relates to a valve and a valve assembly method, such as a valve for controlling a hydraulic fluid and a method of assembling the valve.

BACKGROUND ART

A valve that is used to control a hydraulic fluid in various industrial fields includes a valve seat and a valve body movable close to and away from the valve seat and can control the pressure or flow rate of the hydraulic fluid by adjusting a valve opening degree.

As such a valve, a spool valve in which a spool corresponding to a valve body moves in parallel to an opening corresponding to a valve seat, a butterfly valve of which a valve body has a rotation axis, or a lift valve of which a valve body moves perpendicular to an opening corresponding to a valve seat is typically exemplified. Among these valves, the spool valve has high spool responsiveness to a driving force since a spool movement direction intersects a hydraulic fluid flow direction and a fluid pressure of a hydraulic fluid is less likely to act in the spool movement direction.

As the spool valve, for example, a solenoid valve of Patent Citation 1 is known. The solenoid valve of Patent Citation 1 mainly includes a columnar spool which is accommodated in a sleeve, a solenoid portion which is fixed to one end of the sleeve and drives the spool, a retainer which is fixed to the other end of the sleeve, and a biasing means which is held between the spool and the retainer.

The retainer has a cylindrical shape with a bottom that opens on the sleeve side, and a flange extending radially outward is formed at a sleeve side end. Further, a caulking piece extending from an end surface of the sleeve toward the retainer is formed around the entire circumference on the outer edge of the end of the sleeve on the retainer side. By bending the caulking piece radially inward while disposing the flange of the retainer on the inner radial side of the caulking piece, the flange is axially sandwiched between the caulking piece and the end surface of the sleeve and hence the retainer can be fixed to the end of the sleeve.

CITATION LIST

Patent Literature

Patent Citation 1: WO 2010/024282 A (PAGE 7, FIG. 2B)

SUMMARY OF INVENTION

Technical Problem

In the solenoid valve of Patent Citation 1, since the flange is axially sandwiched between the caulking piece and the end surface of the sleeve with its surface in contact with the end surface of the sleeve, the retainer and the sleeve can be strongly and simply fixed. However, in such a solenoid valve, the caulking piece may be deformed due to aging. As a result, there is a risk that a gap may be formed between the caulking piece and the flange and rattling may occur between the retainer and the sleeve.

The present invention has been made in view of such problems and an object of the present invention is to provide a valve and a method of assembling the valve that can maintain a stable fixed state between a retainer and a casing for a long period of time.

Solution to Problem

In order to solve the foregoing problem, according to a first aspect of the present invention, there is provided a valve including: a casing; a valve body that is operable inside the casing; a biasing member that biases the valve body; and a retainer that holds the biasing member, wherein the retainer is caulked and fixed to the casing by a caulking end provided at one axial end portion of the casing, wherein the retainer includes a cylindrical portion which has a seat surface of the biasing member and an expanded diameter portion which expands radially outward in a tapered shape from one axial end of the cylindrical portion on a side of the casing, and wherein the caulking end is locked to an outer peripheral portion of the expanded diameter portion while a connection portion between the cylindrical portion and the expanded diameter portion is elastically deformable. According to the feature of the first aspect of the present invention, since the elastic restoring force of the connection portion between the cylindrical portion and the expanded diameter portion is acting on the caulking end, the caulking end and the expanded diameter portion are maintained in contact with each other due to the elastic restoring force of the connection portion between the cylindrical portion and the expanded diameter portion even when the caulking end is deformed due to aging. Accordingly, the casing and the retainer do not rattle.

It may be preferable that a space that expands radially inward is formed between the expanded diameter portion and the casing. According to this preferable configuration, the space allows an elastic restoring force to be generated in the retainer with a simple structure.

It may be preferable that a flange portion that extends radially outward along an end surface of the casing is formed at the expanded diameter portion. According to this preferable configuration, since the flange portion comes into surface contact with the end surface of the casing, the retainer can be stably fixed to the casing and an elastic restoring force is easily maintained at the connection portion between the cylindrical portion and the expanded diameter portion.

It may be preferable that a connection portion between the expanded diameter portion and the flange portion is formed to be elastically deformable. According to this preferable configuration, since the connection portion between the expanded diameter portion and the cylindrical portion and the connection portion between the expanded diameter portion and the flange portion are deformable, the relative position between the seat surface of the cylindrical portion and the casing can be finely adjusted. Further, it is easier to maintain contact between the caulking end and the expanded diameter portion.

It may be preferable that an outer peripheral surface of the expanded diameter portion is a flat truncated conical surface. According to this preferable configuration, since a part of the elastic restoring force of the connection portion between the cylindrical portion and the expanded diameter portion acts in the radial direction, it is possible to suppress the inclination of the retainer and the casing.

It may be preferable that the retainer is made of a thin plate. According to this preferable configuration, the retainer can be simply configured.

According to a second aspect of the present invention, there is provided a method of assembling a valve including a casing, a valve body operable inside the casing, a biasing member that biases the valve body, and a retainer that holds the biasing member, the retainer being caulked and fixed to the casing by a caulking end provided at one axial end portion of the casing, the retainer including a cylindrical portion which has a seat surface of the biasing member and an expanded diameter portion which expands radially outward in a tapered shape from one axial end of the cylindrical portion on a side of the casing, wherein the method comprising a step of locking the caulking end to an outer peripheral surface of the expanded diameter portion while a connection portion between the cylindrical portion and the expanded diameter portion is elastically deformable. According to the feature of the second aspect of the present invention, since the elastic restoring force of the connection portion between the cylindrical portion and the expanded diameter portion is acting on the caulking end, the caulking end and the expanded diameter portion are maintained in contact with each other due to the elastic restoring force of the connection portion between the cylindrical portion and the expanded diameter portion even when the caulking end is deformed due to aging. Accordingly, the casing and the retainer do not rattle. Further, since the seat surface of the cylindrical portion and the casing can be positioned at a suitable relative position, the biasing force of the biasing member can be adjusted with high precision.

DESCRIPTION OF EMBODIMENTS

A mode for carrying out a valve according to the present invention will be described on the basis of the embodiment. Furthermore, although the embodiment will be described by using a solenoid valve as an example, it is also applicable to other uses.

EMBODIMENT

A solenoid valve as a valve according to an embodiment of the present invention will be described with reference to FIGS. 1 to 4. Hereinafter, a description will be made assuming that the right side of the paper of FIG. 1 is one axial end side of the solenoid valve and the left side of the paper of FIG. 1 is the other axial end side of the solenoid valve.

Figure 1:
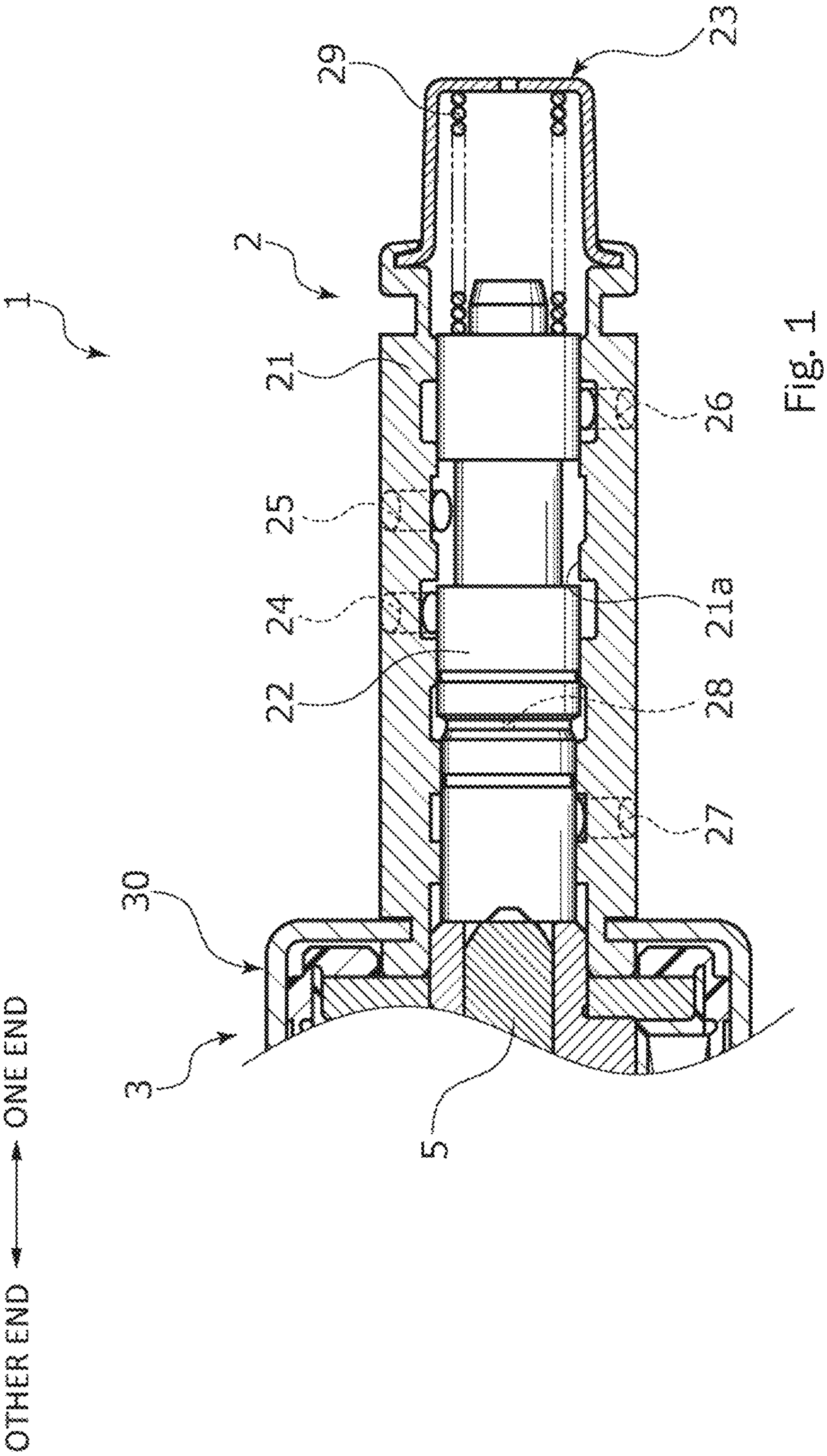
FIG. 1 is a side sectional view illustrating a solenoid valve as a valve according to an embodiment of the present invention.

As illustrated in FIG. 1, a solenoid valve 1 of this embodiment is a spool type solenoid valve, and is used in a device controlled by hydraulic pressure, such as an automatic transmission of a vehicle. Furthermore, the solenoid valve 1 is used by being attached to a mounting hole in a valve housing on the device side.

The solenoid valve 1 includes a valve portion 2 that adjusts the flow rate of fluid, that is, a control fluid such as hydraulic oil, and is integrally attached to a solenoid portion 3. Furthermore, FIG. 1 illustrates the solenoid valve 1 in an off state in which the coil of the solenoid portion 3 is not energized.

First, the structure of the solenoid portion 3 will be schematically described. In the solenoid portion 3, a coil, a stator, a yoke, a movable core, and the like are accommodated in a cylindrical solenoid casing 30. When the solenoid valve 1 is in an off state, a spool 22 is biased toward the other axial end by a biasing force of a spring 29 (see FIG. 1.) and the spool 22 and a rod 5 move toward the other axial end in accordance with this biasing.

Further, when the solenoid valve 1 is in an on state, a magnetic circuit is formed in the solenoid portion 3 by energizing the coil and a magnetic force is generated between the stator and the movable core, so that the movable core and the rod 5 move toward one axial end in the axial direction. Accordingly, the spool 22 moves toward one axial end to compress the spring 29 (not illustrated).

Next, the structure of the valve portion 2 will be described. As illustrated in FIG. 1, the valve portion 2 mainly includes a sleeve 21 which serves as a casing, a spool 22 which serves as a valve body, a spring 29 which serves as a biasing member, and a retainer 23.

The sleeve 21 is provided with openings for various ports such as an input port 24, an output port 25, a discharge port 26, a drain port 27, and a feedback port 28, which are connected to the flow path provided in the mounting hole of the valve housing.

The spool 22 is fluid-tightly accommodated in a through hole 21*a* formed in the axial direction on the inner radial side of the sleeve 21.

The spool 22 is capable of reciprocating in the axial direction, and when the spool 22 is reciprocated in the axial direction, the communication state of various ports is changed, and the pressure and flow rate of the hydraulic oil are controlled. Furthermore, the sleeve 21 and the spool 22 are made of materials such as aluminum, iron, stainless steel, and resin.

The spring 29 is a coil spring, and biases the spool 22 toward the other axial end. Further, one axial end of the spring 29 is held by the retainer 23.

Figure 2:
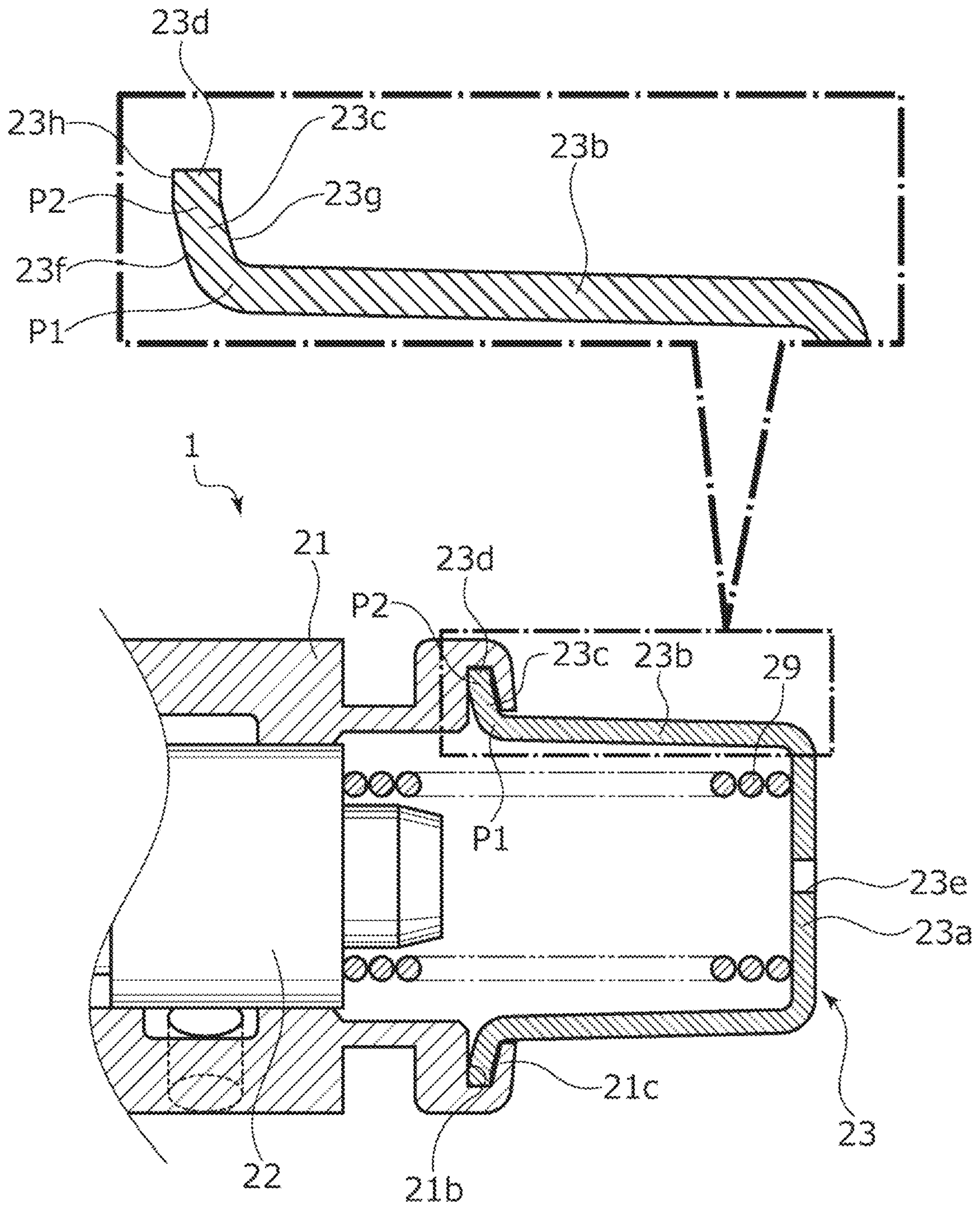
FIG. 2 is an enlarged view of a main part of FIG. 1.

As illustrated in FIG. 2, the retainer 23 has a cylindrical shape with a bottom. Specifically, the retainer 23 includes a disc-shaped bottom portion 23*a* which serves as a seat surface, a cylindrical side wall portion 23*b* which serves as a cylindrical portion extending from the outer edge of the bottom portion 23*a* toward the other axial end, a tapered portion 23*c* which serves as an expanded diameter portion expanding in a tapered shape radially outward toward the other axial side from the other axial end of the side wall portion 23*b*, and an annular flange portion 23*d* which extends radially outward from the other axial end of the tapered portion 23*c*.

The retainer 23 is formed by pressing a thin plate made of a plastically deformable material such as aluminum, iron, or stainless steel, preferably a metal.

One through-hole 23*e* is provided at the center of the bottom portion 23*a*.

The side wall portion 23*b* extends from the outer edge of the bottom portion 23*a* toward the other axial end while being slightly expanded in diameter.

The tapered portion 23*c* is formed by bending the other axial end of the side wall portion 23*b* as a bent portion P1. That is, a bent portion P1 is a connection portion between the side wall portion 23*b* and the tapered portion 23*c*.

An outer peripheral surface 23*g* of the tapered portion 23*c* is a truncated conical surface (hereinafter, simply referred to as a conical surface.) that is flat in the circumferential direction, more specifically, a side surface of the truncated cone.

The flange portion 23*d* is formed by bending the other axial end of the tapered portion 23*c* as a bent portion P2, and extends substantially parallel to the bottom portion 23*a*. That is, the bent portion P2 is a connection portion between the tapered portion 23*c* and the flange portion 23*d*.

The retainer 23 configured in this way is fixed to the sleeve 21 by caulking a caulking piece 21*c* serving as a caulking end, extending from the outer edge of an end surface 21*b* toward one axial end, toward the inner radial side while the other end surface 23*h* of the flange portion 23*d* come into surface contact with the end surface 21*b* on one axial end side of the sleeve 21 (see FIG. 2).

Figure 3:
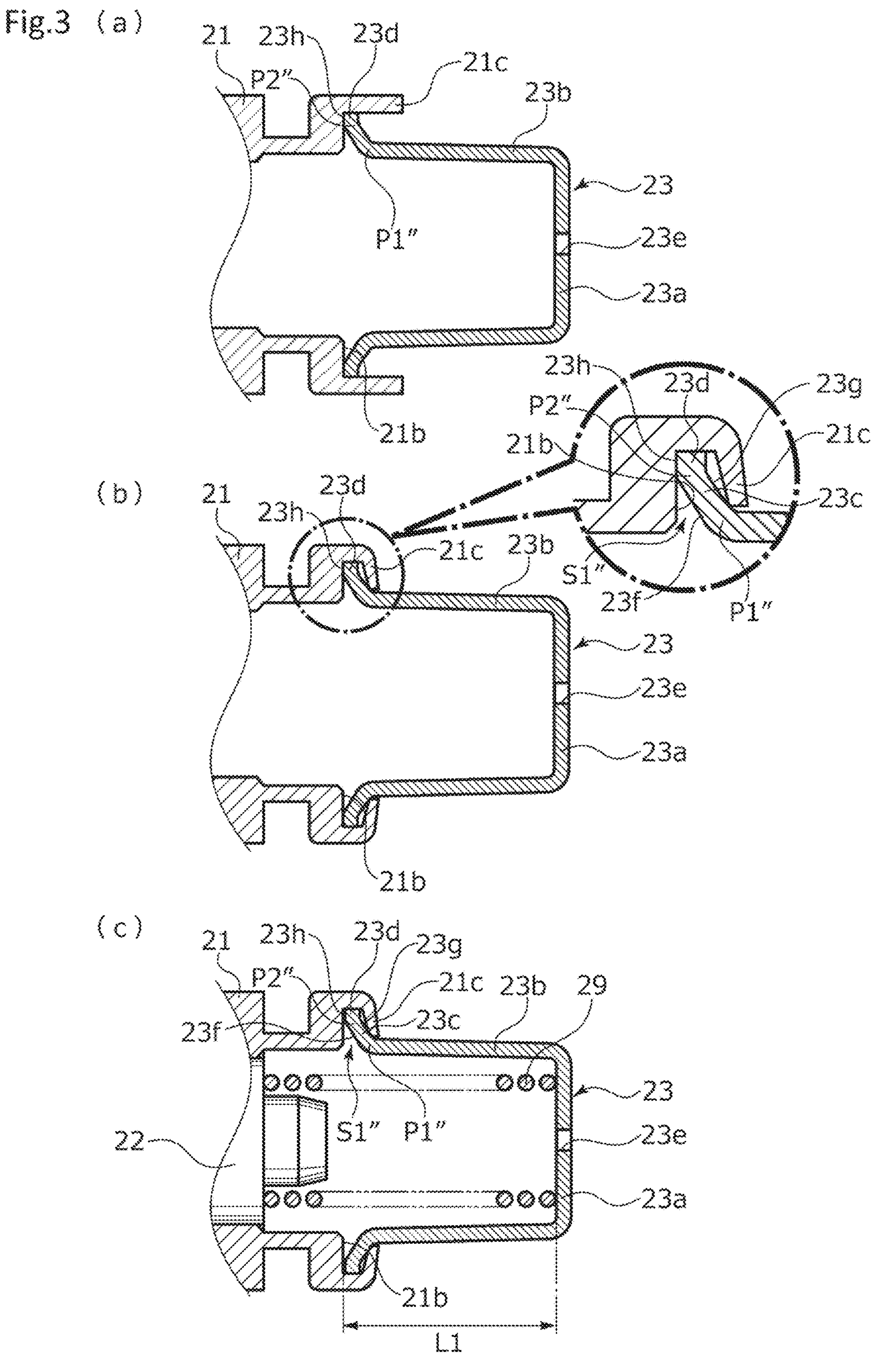
FIG. 3A is a schematic view illustrating a state in which a retainer is disposed at one end of a sleeve.
FIG. 3B is a schematic view illustrating a state in which the retainer is temporarily fixed to one end of the sleeve from the state of FIG. 3A.
FIG. 3C is a schematic view illustrating a state in which a spring and a spool are assembled from the state of FIG. 3B.
Figure 4:
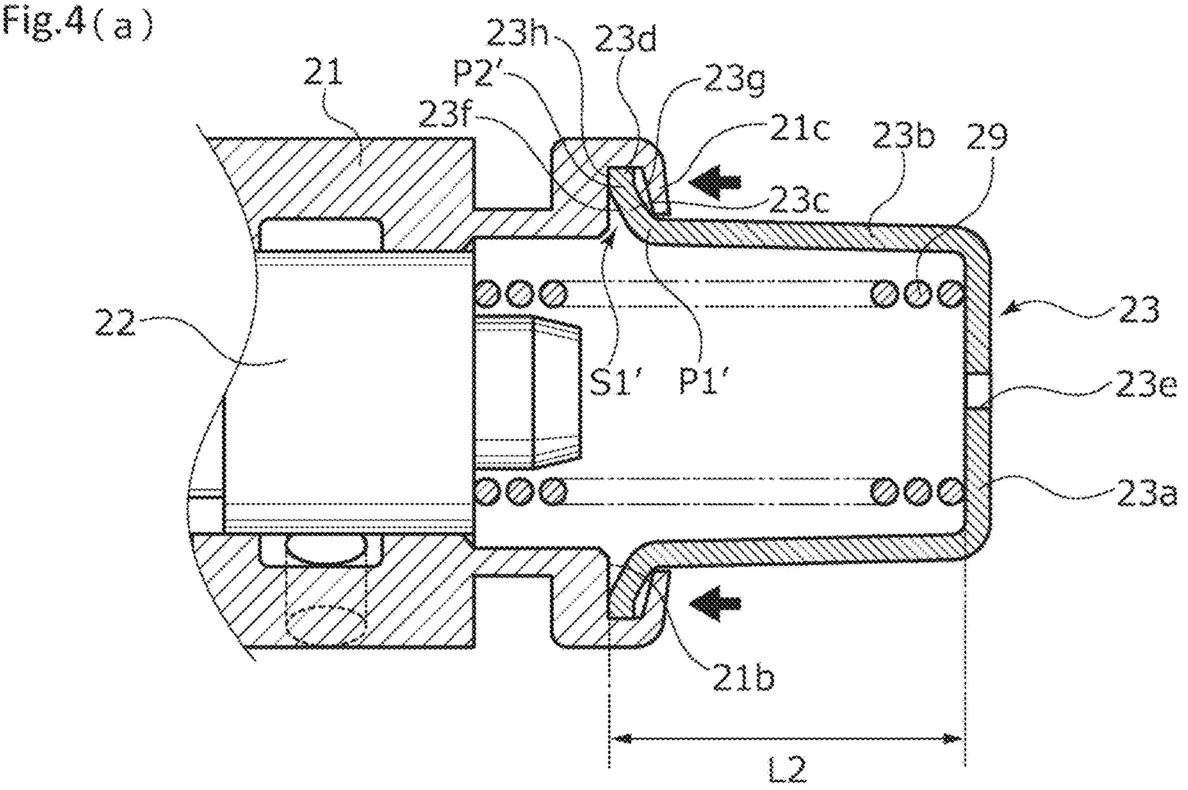
FIG. 4A is a schematic view illustrating a state in which the spring is compressed from the state of FIG. 3C
FIG. 4B is a schematic view illustrating a state in which the spring is further compressed from the state of FIG. 4A.
Figure 4:
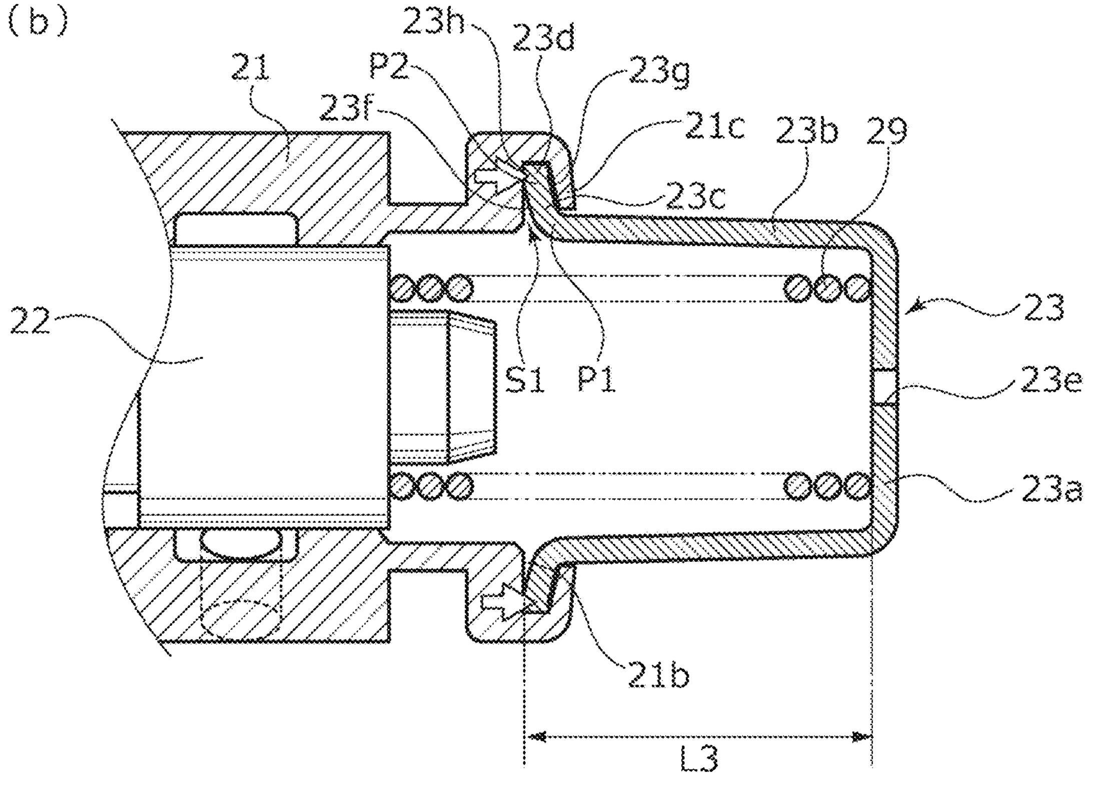

Next, a method of assembling the solenoid valve 1 will be described with reference to FIGS. 3 and 4.

First, as illustrated in FIG. 3A, the other end surface 23*h* of the flange portion 23*d* of the retainer 23 is brought into contact with the end surface 21*b* of the sleeve 21.

Furthermore, the retainer 23 is bent at two bent portions P1" and P2" before caulking.

Since the other end surface 23*h* of the flange portion 23*d* and the end surface 21*b* of the sleeve 21 are annular surfaces extending orthogonally to the axial direction, the other end surface 23*h* of the flange portion 23*d* and the end surface 21*b* of the sleeve 21 can be brought into surface contact with each other.

Next, as illustrated in FIG. 3B, the caulking piece 21*c* extending from the outer edge of the end surface 21*b* of the sleeve 21 toward one axial end is bent radially inward to temporarily fix the retainer 23 to the sleeve 21.

A plurality of the caulking pieces 21*c* are provided in the circumferential direction. Specifically, since the outer edge of the end surface 21*b* is provided in an arc shape except for a part in the circumferential direction, the bending stress can be released to the part divided in the circumferential direction when bending the caulking piece 21*c* radially inward. Furthermore, the caulking piece 21*c* may have one annular shape in the circumferential direction or may have one C-shape in the circumferential direction.

When the retainer 23 is temporarily fixed to the sleeve 21, the caulking piece 21*c* only contacts the outer peripheral surface 23*g* of the tapered portion 23*c* of the retainer 23, and almost no force is applied to press the tapered portion 23*c* toward the other axial end.

Further, when the retainer 23 is temporarily fixed to the sleeve 21, a space S1" is formed between an inner peripheral surface 23*f* of the tapered portion 23*c* and the end surface 21*b* of the sleeve 21 to expand radially inward.

Next, after inserting the spring 29 and the spool 22 from the other axial end of the sleeve 21, the solenoid portion 3 is fixed to the other axial end of the sleeve 21 (that is, the state illustrated in FIG. 3C.). One axial end of the spring 29 is adapted to abut and be received by the bottom portion 23*a* of the retainer 23.

Furthermore, at this time, the axial dimension between the end surface 21*b* of the sleeve 21 and the other end surface of the bottom portion 23*a* of the retainer 23 is L1.

Next, as illustrated in FIG. 4A, the caulking piece 21*c* is pressed toward the other axial end by a jig (not illustrated) to adjust the biasing force of the spring 29 (see black arrow). Furthermore, at this time, the biasing force of the spring 29 is adjusted while directly or indirectly monitoring the biasing force of the spring 29 using a sensor.

In the retainer 23, the tapered portion 23*c* is pressed toward the other axial side by the caulking piece 21*c* so that the bent portions P1" and P2" are elastically deformed to become the bent portions P1' and P2' (from P1", P2" to P1', P2').

Specifically, the bent portion P1' is elastically deformed from the state illustrated in FIG. 3C in a direction in which the tapered portion 23*c* is expanded in diameter with respect to the side wall portion 23*b*. The bent portion P2' is elastically deformed from the state illustrated in FIG. 3C in a direction in which the tapered portion 23*c* approaches parallel to the flange portion 23*d*. Accordingly, the bottom portion 23*a* approaches the end surface 21*b* of the sleeve 21 in the axial direction.

In other words, since the space S1" formed between the inner peripheral surface 23*f* of the tapered portion 23*c* and the end surface 21*b* of the sleeve 21 can be used as an elastic deformation margin for the bent portions P1" and P2", the bottom portion 23*a* can be moved toward the end surface 21*b* of the sleeve 21 in the axial direction.

An axial dimension L2 between the end surface 21*b* of the sleeve 21 and the other end surface of the bottom portion 23*a* of the retainer 23 becomes shorter than the axial dimension L1 of FIG. 3C (L1>L2).

Furthermore, in the state of FIG. 4A, the tapered portion 23*c* is inclined in the direction of enlarging the diameter with respect to the side wall portion 23*b*, so that the space S1' becomes narrower than the space S1" (from S1" to S1').

As illustrated in FIG. 4B, the caulking piece 21*c* is further pressed toward the other axial end by a jig (not illustrated) so that the bottom portion 23*a* further approaches the end surface 21*b* of the sleeve 21 in the axial direction.

In other words, an axial dimension L3 between the end surface 21*b* of the sleeve 21 and the other end surface of the bottom portion 23*a* of the retainer 23 becomes shorter than the axial dimension L2 of FIG. 4A (L2>L3). This axial dimension L3 is a dimension in which the biasing force of the spring 29 is appropriate.

Furthermore, the bent portions P1' and P2' are elastically deformed to become the bent portions P1 and P2 (from P1', P2' to P1, P2). Further, the space S1' becomes a space S1 narrower than the space S1' (from S1' to S1).

Thereafter, assembly of the solenoid valve 1 is completed with the biasing force of the spring 29 in an appropriate state by removing the jig (not illustrated).

In this state, the bent portions P1 and P2 try to be elastically restored, but since the outer peripheral surface 23*g* of the tapered portion 23*c* is locked to the plastically deformed caulking piece 21*c*, the retainer 23 is maintained in an axially compressed state. That is, an elastic restoring force (see white arrow) of the bent portions P1 and P2 of the retainer 23 acts between the caulking piece 21*c* and the end surface 21*b* of the sleeve 21.

Since the outer peripheral surface 23*g* of the tapered portion 23*c* is a flat conical surface and an elastic restoring force acts approximately uniformly in the circumferential direction on the caulking piece 21*c*, the relative inclination between the sleeve 21 and the retainer 23 is regulated.

Further, since the through-hole 23*e* is provided in the bottom portion 23*a* of the retainer 23 and the through-hole 23*e* can be used as a breathing hole to allow hydraulic oil to flow, the spool 22 can be operated smoothly when the solenoid valve 1 is used.

Furthermore, when adjusting the biasing force of the above-described spring 29, the outer peripheral surface of the flange portion 23*d* may be in contact with the inner surface of the caulking piece 21*c* or may be separated from the inner surface of the caulking piece 21*c*.

Since the caulking piece 21*c* is locked to the outer peripheral surface 23*g* of the tapered portion 23*c* while the bent portions P1 and P2 are elastically deformed in a compressing direction as described above, the biasing force of the spring 29 can be adjusted with high accuracy.

Further, since the elastic restoring force of the bent portions P1 and P2 of the retainer 23 is acting on the caulking piece 21*c*, the caulking piece 21*c* and the tapered portion 23*c* are maintained in contact with each other due to the elastic restoring force of the retainer 23 even when the caulking piece 21*c* is deformed, for example, in the opening direction due to aging. Accordingly, the sleeve 21 and the retainer 23 do not rattle.

Further, since the space S1 expanding radially inward is formed between the end surface 21*b* of the sleeve 21 and the inner peripheral surface 23*f* of the tapered portion 23*c* and the space S1 can be used as an elastic deformation margin for the bent portions P1 and P2, the bent portions P1 and P2 can be largely elastically deformed. Therefore, the space S1 allows the retainer 23 to generate an elastic restoring force with a simple structure.

Further, the other axial end of the tapered portion 23*c* is provided with the flange portion 23*d* that extends radially outward along the end surface 21*b* of the sleeve 21. Accordingly, since the flange portion 23*d* comes into surface contact with the end surface 21*b* of the sleeve 21, the retainer 23 can be stabilized with respect to the sleeve 21 and the long arm length can be ensured. As a result, the bent portion P1 can be easily elastically deformed.

Further, since the retainer 23 is configured such that the bent portion P2 is also elastically deformable in addition to the bent portion P1, the relative position in the axial direction between the bottom portion 23*a* of the side wall portion 23*b* and the sleeve 21 can be finely adjusted. Further, the contact between the caulking piece 21*c* and the tapered portion 23*c* is more easily maintained.

Further, since the outer peripheral surface 23*g* of the tapered portion 23*c* is a flat conical surface, the elastic restoring force of the bent portion P1 acts approximately evenly in the circumferential direction of the caulking piece 21*c* and hence the relative inclination between the retainer 23 and the sleeve 21 can be suppressed.

Further, since the retainer 23 is made of a thin metal plate, the retainer 23 whose bent portions P1 and P2 can be elastically deformed can be easily configured.

Although the embodiment of the present invention has been described above with reference to the drawings, the specific configuration is not limited to these examples, and any changes or additions that do not depart from the scope of the present invention are included in the present invention.

For example, in the above-described embodiment, although it has been described that the space S1 expanding radially inward is formed between the end surface 21*b* of the sleeve 21 and the inner peripheral surface 23*f* of the tapered portion 23*c*, the present invention is not limited thereto, and for example, a space having a constant width may be formed between the end surface of the sleeve and the inner peripheral surface of the tapered portion.

Further, in the above-described embodiment, although it has been described that the retainer 23 includes the annular flange portion 23*d* extending radially outward from the other axial end of the tapered portion 23*c*, the present invention is not limited thereto, and the flange portion may not be provided.

Further, in the above-described embodiment, although it has been described that the bent portion P2 corresponding to the connection portion between the flange portion 23*d* and the tapered portion 23*c* is elastically deformable, the connection portion between the flange portion and the tapered portion may not be elastically deformable.

Further, in the above-described embodiment, although it has been described that the outer peripheral surface 23*g* of the tapered portion 23*c* is a flat conical surface, the present invention is not limited thereto, and for example, the outer peripheral surface of the tapered portion may be provided with a groove that engages with the end portion of the caulking end.

Further, in the above-described embodiment, although it has been described that the tapered portion 23*c* and the flange portion 23*d* are formed in an annular shape, the present invention is not limited thereto, and the expanded diameter portion and the flange portion may be a plurality of pieces provided in the circumferential direction.

Further, in the above-described embodiment, although it has been described that the retainer 23 is made of a plastically deformable metal thin plate, the present invention is not limited thereto, and the material can be freely changed as long as at least the connection portion between the cylindrical portion and the expanded diameter portion is deformable.

Further, in the above-described embodiment, although it has been described that the biasing member is a compression spring, the biasing member may be a tension spring.

Further, in the above-described embodiment, although a spool type valve that uses a spool as a valve body has been described, the present invention is not limited thereto, and a globe valve, a gate valve, or the like may be used.

REFERENCE SIGNS LIST

1 Solenoid valve (valve)
21 Sleeve (casing)
21*b* End surface
21*c* Caulking piece (caulking end)
22 Spool (valve body)
23 Retainer
23*a* Bottom portion (seat surface)
23*b* Side wall portion (cylindrical portion)
23*c* Tapered portion (expanded diameter portion)
23*d* Flange portion
29 Spring (biasing member)
P1, P2 Bent portion
S1 Space

The invention claimed is:

1. A valve, comprising:

a casing;

a valve body that is operable inside the casing;

a spring that biases the valve body; and a retainer that holds the biasing member, wherein the retainer is caulked and fixed to the casing by a caulking end provided at one axial end portion of the casing, wherein the retainer includes a cylindrical portion which has a seat surface of the biasing member and which extends in an axial direction, an expanded diameter portion which extends straight so as to expand radially outward in a tapered shape from one axial end of the cylindrical portion on a side of the casing, and a flange portion which extends from a casing side of the expanded diameter portion toward a radially outward side, wherein the cylindrical portion and the expanded diameter portion are connected by a first bent portion, wherein the expanded diameter portion and the flange portion are connected by a second bent portion, and wherein the caulking end is locked to an outer peripheral portion of the expanded diameter portion while the first bent portion connecting the cylindrical portion and the expanded diameter portion is elastically deformable.

2. The valve according to claim 1, wherein a space that expands radially inward is formed between the expanded diameter portion and the casing.

3. The valve according to claim 1, wherein an outer peripheral surface of the expanded diameter portion is a flat truncated conical surface.

4. The valve according to claim 1, wherein the retainer is made of a thin plate.

5. A method of assembling a valve including a casing, a valve body operable inside the casing, a spring that biases the valve body, and a retainer that holds the biasing member, the retainer being caulked and fixed to the casing by a caulking end provided at one axial end portion of the casing, the retainer including a cylindrical portion which has a seat surface of the biasing member and which extends in an axial direction, an expanded diameter portion which extends straight so as to expand radially outward in a tapered shape from one axial end of the cylindrical portion on a side of the casing, and a flange portion which extends from a casing side of the expanded diameter portion toward a radially outward side, the cylindrical portion and the expanded diameter portion being connected by a first bent portion, the expanded diameter portion and the flange portion being connected by a second bent portion, wherein the method comprising a step of locking the caulking end to an outer peripheral surface of the expanded diameter portion while the first bent portion connecting the cylindrical portion and the expanded diameter portion is elastically deformable.

* * * * *